US006212401B1

(12) United States Patent
Ackley

(10) Patent No.: US 6,212,401 B1
(45) Date of Patent: Apr. 3, 2001

(54) DATA ACQUISITION USING TELEPHONE CONNECTION

(75) Inventor: H. Sprague Ackley, Seattle, WA (US)

(73) Assignee: Intermec Corporation, Everett, WA (US)

(*) Notice: Subject to any disclaimer, the term of this patent is extended or adjusted under 35 U.S.C. 154(b) by 0 days.

(21) Appl. No.: 08/774,103

(22) Filed: Dec. 24, 1996

(51) Int. Cl.[7] ........ H04B 1/38

(52) U.S. Cl. ........ 455/556; 455/557; 455/564

(58) Field of Search ........ 455/90, 403, 422, 455/550, 557, 556, 426, 564, 11.1, 69, 38.3, 517, 575; 379/355; 235/462, 472

(56) References Cited

U.S. PATENT DOCUMENTS

| | | | | |
|---|---|---|---|---|
| 4,535,204 | * | 8/1985 | Hughes et al. | 379/355 |
| 4,916,441 | * | 4/1990 | Gombrich | 455/575 |
| 4,975,948 | * | 12/1990 | Andresen et al. | 379/355 |
| 5,144,654 | * | 9/1992 | Kelley et al. | 379/355 |
| 5,218,187 | * | 6/1993 | Koenck et al. | 235/462 |
| 5,322,991 | * | 6/1994 | Hanson | 455/575 |
| 5,479,480 | * | 12/1995 | Scott | 455/557 |
| 5,563,402 | * | 10/1996 | Reddersen et al. | 235/462 |
| 5,634,080 | * | 5/1997 | Kikinis et al. | 455/575 |
| 5,682,379 | * | 10/1997 | Mahany et al. | 455/11.1 |
| 5,727,057 | * | 3/1998 | Emery et al. | 455/69 |
| 5,778,314 | * | 7/1998 | Sudo et al. | 455/564 |
| 5,822,427 | * | 10/1998 | Braitberg et al. | 455/38.3 |
| 5,826,198 | * | 10/1998 | Bergins et al. | 455/557 |
| 5,857,156 | * | 1/1999 | Anderson | 455/517 |
| 5,872,835 | * | 2/1999 | Yoo et al. | 455/557 |
| 5,923,735 | * | 7/1999 | Swartz et al. | 455/557 |

* cited by examiner

*Primary Examiner*—Dwayne Bost
*Assistant Examiner*—Quochien Vuong
(74) *Attorney, Agent, or Firm*—Joan H. Pauly

(57) ABSTRACT

A hand-held scanner incorporates a cellular telephone module. The scanner communicates with a host which serves as a reading or data distribution device. This permits the use of a cableless scanner for low powered and secure wireless transmission. The scanner is able to take advantage of the existing design features of a local cellular network. One mode of operation allows the connection to be limited to an amount of time corresponding to that required for transferring of the data.

25 Claims, 3 Drawing Sheets

DATA ACQUISITION USING TELEPHONE CONNECTION

FIELD OF THE INVENTION

This invention relates to data scanners and to telephony. More particularly, the invention relates to data scanning, such as bar code scanning, in which scanned data is supplied to a remote central computer or data depository via a cellular telephone connection.

BACKGROUND OF THE INVENTION

Automation of the data collection function offers a practical way to bring the pace of data collection more closely in line with data processing. Many manual methods, such as keyboard entry, are considered too slow, costly and error prone to satisfy modern criteria. For this reason, bar code automated data collection technology has gained wide acceptance. The automated data collection process has three phases:

1. Print—Automatic identification is the essential first step, accomplished by attaching a bar code label to a part, document, package, personal identification badge or some other item to be tracked.
2. Capture—The data collection phase occurs when a part moves in or out of inventory, a workpiece comes in or out of a given stage in the manufacturing process, or an employee checks in or out of work. These actions are instantly and accurately captured by scanning the bar code label. Scanners can read information far faster than humans can write or type, and they are far more accurate Compared to an average human transcription error rate of one per 300 characters, the automated error rate is in the range of one per 3 million.
3. Connect—Compiling and computer system input occurs when scanned data is compiled into a central point and manipulated into a form appropriate to the data stream of a host computer. The upshot is accurate data automatically captured as each event occurs, thus permitting management decisions based on solid, current information.

One of the difficulties in the "capture" and the "connect" phases of data collection is the transfer of data to the central point. In conventional bar code systems, the data is commonly collected from a hand-held bar code scanner by cabling the scanner to a reading and/or data distribution device. This allows the scanner to be low power and lightweight. A major disadvantage of a cable link is that scanner use is restricted by the cable. In addition, the scanner operator is required to carry the reader and/or data distribution device.

The assignee of the applicant has considered the use of hand-held scanners fitted with radios as an alternate to cabled scanners. This approach also has significant disadvantages. Radios are heavy, power intensive, and limited in range. In addition, some radios require licensing, and those that do not may be subjected to interference with other radios. Furthermore, installing a radio-based data collection system in an existing facility can be prohibitively expensive.

A symbology-reading input device typically uses a sensing beam to read symbology information, such as a bar code, which consists of alternating areas ("bars") having differing characteristics to which the beam is sensitive. The bar code, or other symbology, can be used to store information or commands which are addressed to other devices. During scanning of the symbology, the input device receives and interprets the fluctuations in the returning sensing beam that are caused by the symbology. For example, it is known to read symbology by means of a hand-held wand which makes contact with the surface on which the symbology is printed and reads the symbology by means of a beam of light. It is also known to use a non-contact scanning device to cause a beam of light to scan across an area containing a bar code. The forms of symbology information include punch cards, magnetically encoded data, passive resonators, and transponder data (radio frequency identification or RFID).

More recently, "two-dimensional" bar codes have been employed. Two-dimensional bar codes often do not appear as alternating bars, but instead may include a different symbology format, such as a matrix format. For the purpose of this invention, "bar code" and "bar code information" is intended to include various types of codes and information which are read by symbology-reading input devices. In addition, other scanner devices are capable of reading different types of symbologies, such as magnetic strip codes and transmissions from RFID devices. These types of scanners may also be used with this invention.

A symbology image is an image representation of information, such as, but not limited to, bar codes. An optical scanning device is a device for reading the bar codes, and may be a decoding or a non-decoding scanner.

optical scanners, as input devices, typically transform the reflected scanning beam to an electronic data form for decoding. In one type of system, the electronic data form is then input to the system wherein a symbology-reading input device driver decodes the electronic data form into a form recognizable by a bar code-reading application program operating on the system. While light used for such scanning is usually visible, optical scanners may also use non-visible light.

SUMMARY OF THE INVENTION

According to the present invention, symbology information is transferred to a reading and/or data distribution host device by using a cellular telephone link. Data retrieved by an input device is provided to a modem which is connected to a cellular telephone transceiver. This enables the transmission of remotely-accessed data without a requirement that a separate communications base station be established. In addition, in commercial enterprises where an existing local cellular network is available, full remote access is easily provided. When the host is connected, the data is transferred via the modem and the cellular telephone connection.

In accordance with one aspect of the invention, a device is provided for scanning symbology and transmitting information contained in the symboloby to a remote host, which is preferably connected to a telephone system. The device includes a housing with a handle configured to be gripped by an operator, and an optical scanner carried by the housing. The optical scanner is capable of reading symbology when an operator gripping the handle moves said device into proximity of the symbology. A cellular telephone module mounted in the housing is connectable to a cellular telephone network. A modem in the housing interconnects the scanner and the module to enable transmission of information contained in said symbology through the cellular network. A battery mounted in said housing powers the scanner, module, and modem.

In one form of the invention, a cellular telephone link is used, and when data is scanned by the data input device, the data is communicated to the modem and the modem causes a preselected number to be dialed for connection to the host. The host may be directly connected to the cellular telephone network, or may be connected to the cellular telephone network through a further telephone line connection.

Commercial telephone communications using cellular telephone networks are billed primarily on a timed basis. In the case of the transmission of symbology-related data, costs can be kept at a minimum by automatically establishing a connection and transferring the data. This minimizes costly connect time, while using the existing telephone equipment associated with a cellular telephone network.

The present invention is suitable for use with localized cellular telephone equipment, where a local PBX or private business telephone exchange uses cellular telephone connections to communicate within the exchange. These function in a manner similar to public cellular telephone equipment, with the exception that the equipment is within a private domain. This permits installation of the inventive scanner without the expense of installing a dedicated data communications network. This also allows the use of the cellular telephones to be less time sensitive with respect to cost. Furthermore, since the extent of operation of a local cellular telephone exchange is limited, operating costs are greatly reduced. In the case of use with symbology scanning equipment, the cellular telephone coverage can be limited to the areas at which scanning is expected to take place.

One advantage of the use of cellular technology for communicating scanned data is that the local cellular exchange can share the same technology and protocols with a public cellular telephone network. Thus, the equipment can be used to gain access to a public cellular telephone exchange in the event that scanning is performed outside of the coverage area of a local PBX cellular telephone exchange. If scanning outside of the local exchange takes place, a cellular connection can be established on the public cellular telephone network. In addition, it is unnecessary to use a local PBX exchange if one is to accept the cost of scanning through public cellular telephone networks.

The use of a cellular telephone communication system allows a cableless laser scanner to operate at reduced power for long battery life. This is because the cellular telephone communication protocol is designed to operate with reduced power, using a repeater or relay system which is designed for this purpose. The cellular communication protocol further ensures that the connection is more secure in that interference is reduced. Since cellular communications equipment is widely available, sophisticated technology can be employed at a relatively low cost.

In accordance with a further aspect of the invention, a remote symbology input device is activated either manually or with a motion sensor. When the scanner is activated, a cellular telephone connection is established. The scanner, after performing a scanning operation, collects and decodes signal counts. When the signal counts have been received, the scanner notifies the cellular telephone connection that data is received. The cellular connection then transmits the data to a host computer via the cellular connection. The host computer acknowledges the data and the user is notified of a successful transmission or a failed scan, as appropriate.

The connection of the scanner to the cellular telephone module permits the scanner to control the dial function of the cellular telephone module. Telephone numbers to be dialed can be scanned with the scanner. It is therefore possible to eliminate the numeric keypad from the cellular telephone module and still provide a dialing capability, although limited to inputs which are scanned.

In accordance with a further aspect of the invention, a scanner is provided with a cellular telephone transceiver, and the scanner provides control and programming inputs to the cellular telephone module. In response to a predetermined code sequence which is input by scanning a bar code, the scanner provides the programming and control inputs. These inputs may be used to select preferred numbers to be stored in a memory of the cellular transceiver and control connection sequences. This makes it possible to operate a cellular telephone transceiver which is designed for use with a keypad without providing the keypad. In one configuration, a predetermined code initiates a "keyboard control" function of the scanner. Once the keyboard control function is activated, the scanner provides keyboard inputs to the cellular telephone transceiver, so that scanned inputs can be used to effect keyboard functions until the keyboard function is made inactive. During normal operation, the scanner provides such keyboard function inputs in order to provide necessary connections between the scanner and a host which receives scanned inputs.

In accordance with a further aspect of the invention, a scanner is able to provide data in a bit stream, which is then transmitted via a cellular telephone transmission to a host. The scanner can be controlled to establish the telephone connection to the host only when data is available for transmission, and then to close the connection. This permits cellular air time to be limited to time necessary to transmit and acknowledge data, thereby reducing cost and system usage resulting from cellular connect time.

In addition to use with a symbology reading input device, the present invention can be used to transmit related data, such as manually input data relating to the scanned items, or data to be supplied to a remote printing device.

BRIEF DESCRIPTION OF THE DRAWINGS

Like reference numerals are used to indicate like parts throughout the various figures of the drawing, wherein.

DETAILED DESCRIPTION OF THE PREFERRED EMBODIMENTS

Figure 1:
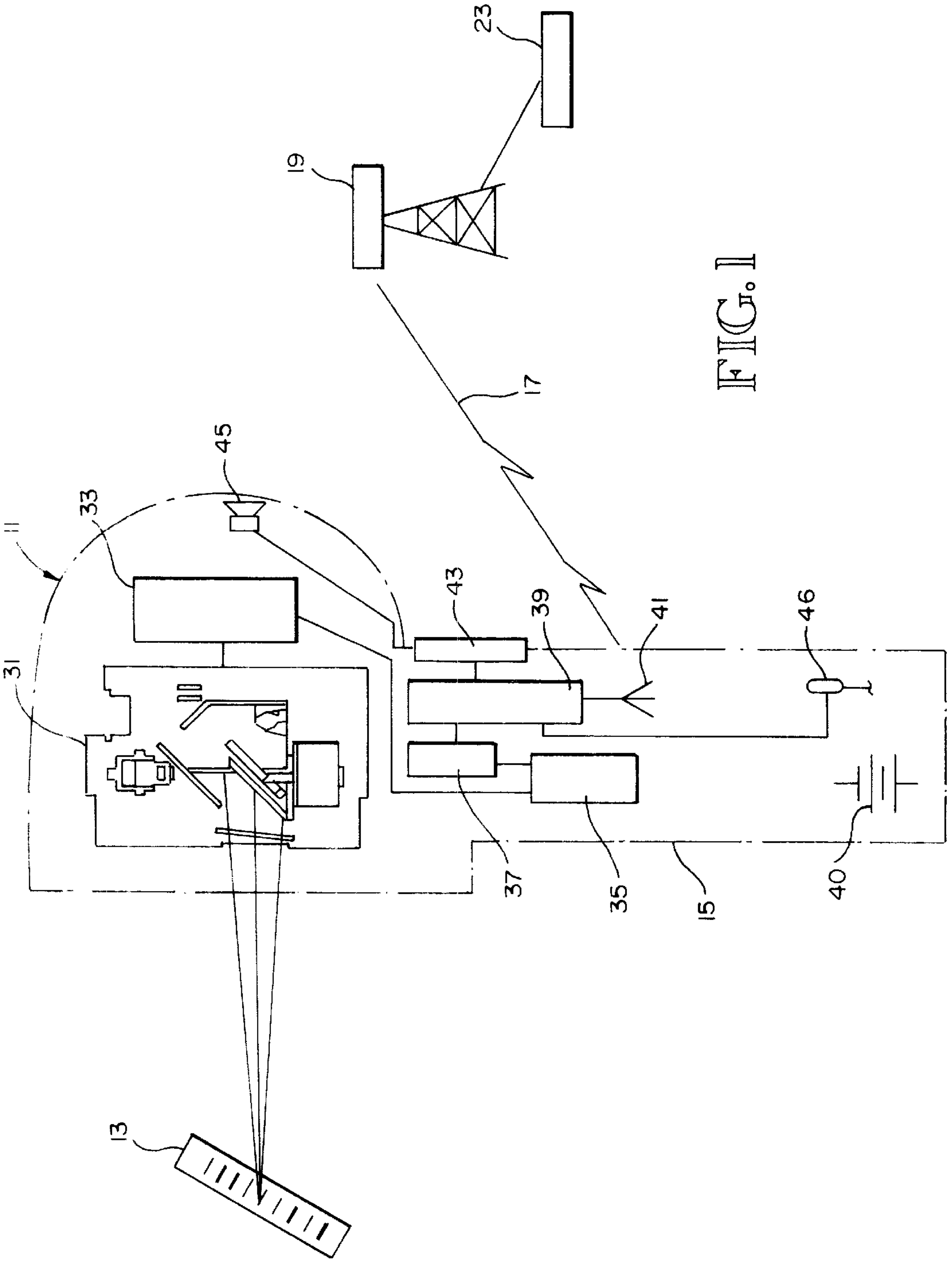
FIG. 1 shows a block diagram in which a scanner is connected to provide cellular communications.

FIG. 1 shows a block diagram of the inventive system. A hand-held scanner, such as a symbology-reading input device 11 is used to read a bar code 13 or other scanned object. Information from the scanned object is analyzed in the scanner 11, which provides a scanned output in the form of a data stream. In its preferred embodiment, the scanner 11 is gripped with a handle portion 15, which forms part of the scanner's housing, to effect a scan of the target 13.

In the preferred embodiment, the data stream comprises data interpreted from the scanned object 13, although it is also possible to provide, as the data stream, raw video counts or undecoded pulse modulations, a raster scan image, or the equivalent. When an image is scanned by the scanner 11, the data stream is transmitted, as a telephone transmission, represented by 17, to a cellular telephone network, represented by repeater 19. The cellular telephone network then transmits the image data to a computer host 23. The host 23 is generally hardwired to the cellular telephone network (19) as a telephone connection. It is also possible to provide a cellular connection to the host 23. An example of a computer host is the Intermec J2020, sold by Intermec Corporation of Everett, Washington, the assignee of the present inventor. Another example of a host is an IBM AS400 mainframe computer.

In the scanner unit 11, an optical scanning device 31 provides image data which is transmitted to image processor 33. The image processor 33 resolves the image data and provides the resolved image data to a cellular controller 35 which transmits the signal to a modem 37. The output from the image processor 33 is referred to as "raw scanner video counts." The video counts are provided to a remote processor or are decoded and the decoded data is provided as a bit stream to a remote processor. In this case, the remote processor is computer host 23. An example of an optical scanning device and image processor is found in the Intermec Sabre 1551 decoded laser scanner, sold by Intermec Corporation.

A non-decoding scanner, such as that used in an Intermec 1550 scanner or in an Intermec J7010 video image scanner may also be used. If a non-decoding scanner is used, it is likely that a substantial volume of data will need to be transferred to the host 23 along telephone connection 17. The use of a non-decoding scanner has the advantage of not requiring upgrades for each scan program, but requires that transmission of the increased volume of data be acceptable.

In the preferred embodiment, the cellular controller 35 is a microprocessor circuit. There are a large number of types of suitable microprocessors available. In this case, the microprocessor 35 responds to a particular signal by providing a switching signal as its output. The switching functions could be performed by a processor which is part of the existing circuitry of the Intermec J7010 scanner.

The data from the image processor 33 is provided to the modem 37. In the case of an image scanner, the data is provided as a video raster scan image to the modem 37. The modem 37 upon receipt of the data stores the data in a buffer and provides a "start" signal to a cellular telephone module 39. This causes the cellular telephone module 39 to establish a connection to the host 23. The host 23 is established as a preferred telephone number, so that by default, the cellular telephone module 39 dials the number which establishes the host connection.

The scanner 11 derives power from a battery 40, which provides power to the cellular telephone module 39, as well as the optical scanning device 31, image processor 33, cellular controller 35 and modem 37. In addition, the cellular telephone module 39 is connected to an antenna 41, which is also in the scanner 11. The antenna may be very small and may be either entirely inside the handle 15 or may extend from the handle 15. Since the scanner 11 is hand-held, one is able to scan symbology by bringing the scanner 11 into proximity of the target 13, without being restricted by a cable tether.

Once the host connection is established, the host 23 provides a response, indicating either that the scan was successfully interpreted by the host 23 or that the scan failed. Once the controller 35 receives a signal that the transmission of the scan was successfully completed, the cellular telephone connection is closed. The "successful scan" signal preferably is an acknowledgment signal from the host 23.

In the preferred embodiment, the scanner 11 is activated by a motion sensor (not shown), although it is also possible to manually activate the scanner 11, such as by pulling a trigger. If the scanner 11 is intended for use with a local PBX cellular telephone network, the scanner 11 would, upon such activation, engage a cellular telephone connection. The scanner 11 then collects signal counts and decodes the signal counts. The signal counts, when decoded, are typically an ASCII bit stream. When the scanner 11 successfully decodes the counts, the operator is notified. The operator is also notified of a failed scan.

Initiating the host connection upon initial movement of the scanner 11 permits the transfer of data to be expedited because the connection is likely to be already established when the scan is completed. In the preferred embodiment, the controller terminates the call after a timeout in either movement or receipt of scanned data. This would correspond to a predetermined delay in receiving data after which it is assumed that receipt of other data is unlikely. It is also possible to disconnect the connection after termination of transmission of the data, or after a manual command to disconnect or go "on hook." If termination is automatic, the connection can be terminated by a timeout after non-use of the scanner 11, which may include the motion detector ceasing to sense motion.

As a matter of convenience to the user, a conventional cellular keypad 43 is provided, so that voice telephone communications may be conducted through transducers 45, 46 in the normal fashion. It is alternatively possible to provide the equipment without a keypad. In that case, the image processor 33, upon receipt of a predetermined code, reads a dial command to the cellular telephone module 39. The dial commands are used to control memory and dial functions on the cellular telephone module 39. Therefore, the scanning circuitry (image processing circuitry 33) is used to provide the programming inputs to the cellular telephone module 39. This would typically include the preferred telephone number, a selection of the mode of operation, and any other desired telephone numbers. Since the numbers are scanned, it is also possible to provide a scannable series of single digits which can be used to scan in any desired telephone number.

The cellular telephone module 39 is preferably able to be operated within either a localized cellular telephone network or a public cellular telephone network. In the case of a public cellular telephone network, the ability to maintain a connection only long enough for the data to be transferred and the host 23 to acknowledge successful scanning allows the time of operation of the cellular connection to be limited, thereby reducing costs.

Once the data from the scan is obtained, the scanner 11 notifies the host 23 that data is ready for transmission, and receives a signal from the host 23 that the host 23 is ready to receive signal data. This is functionally similar to the RTS/CTS signal format, and thereby permits the modem 37 to control transmission of data to the cellular module 39. The modem 37 then sends the data via the cellular module 39 through the cellular connection 19 to the host 23. The host 23 then acknowledges the receipt of data, which acknowledgment is received by the cellular controller 35.

Figure 2:
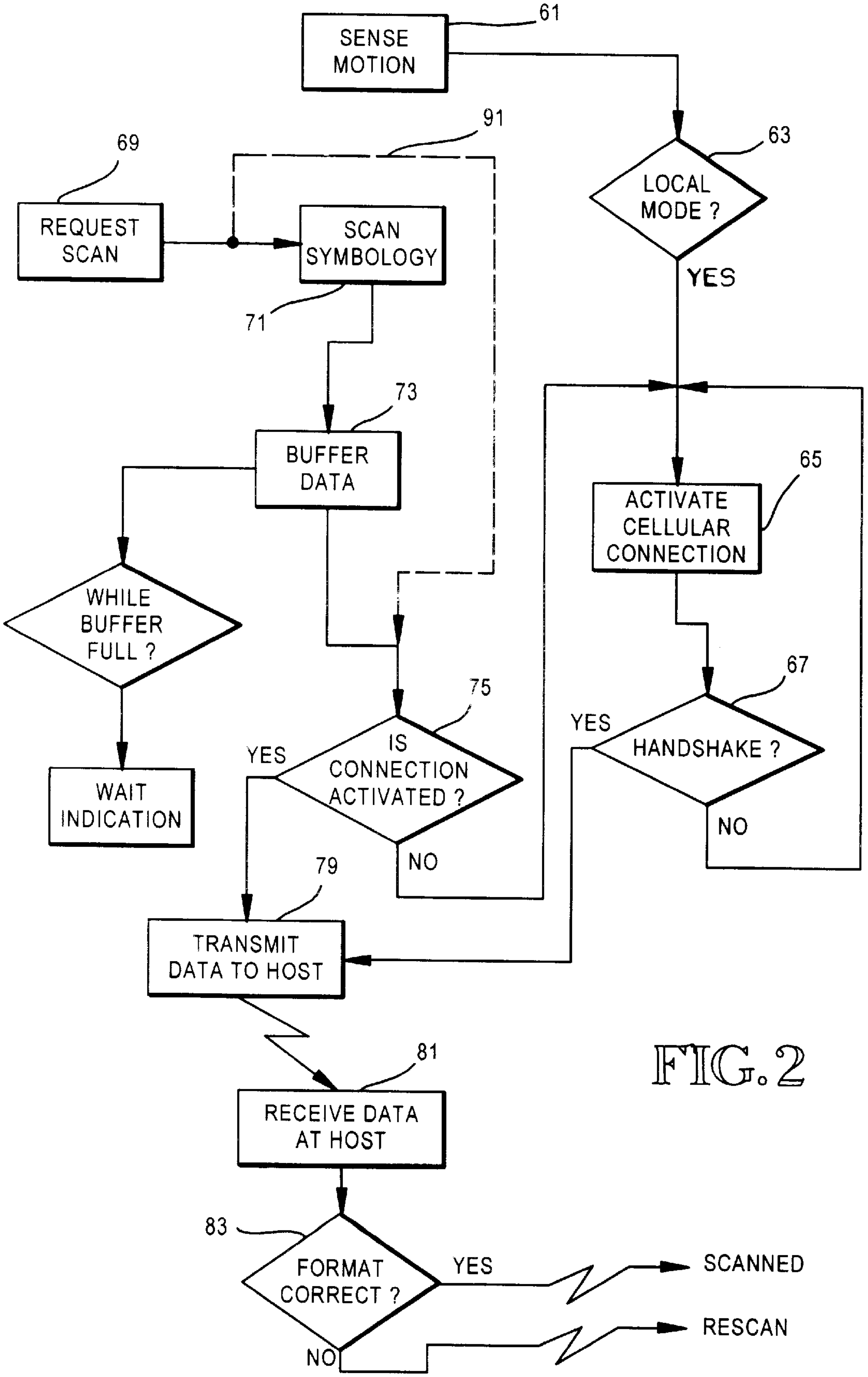
FIG. 2 shows the logic of operation of the inventive scanning system.

FIG. 2 is a flow chart showing the data acquisition according to a preferred embodiment. Upon detection of movement, indicated at block 61, a determination is made as to whether the scanner 11 is in a local mode of operation, as indicated at block 63. In the local mode, the scanner 11 activates a cellular connection, as indicated at block 65. Upon establishing the cellular connection, a digital handshake is effected, wherein modem communications between the host 23 and the scanner 11 are established. The handshake is indicated at block 67, and is shown as a decision block because the handshake is confirmed. A request for scan, indicated at block 69 and typically effected by a trigger operation, activates the optical scanning device 31, which provides the image data to the image processor 33. The scanning step is represented by block 71. Upon scanning, the data is provided to a buffer, as indicated at block 73. The receipt of data by the buffer initiates a cellular connection (block 65) if such a connection 65 is not already activated, as indicated at block 75. Upon establishment of a handshake, indicated at block 67, data from the buffer is transmitted to the host, as indicated in block 79.

The host 23 receives the transmitted data, as indicated at block 81 and determines if the transmission is properly received, as indicated at block 83. The host 23 then transmits back to the scanner 11 an acknowledgment or a negative acknowledgement, indicating that a successful scan has taken place or has not taken place, as the case may be.

Two dimensional bar codes are often scanned, for instance by the Intermec J7010 image scanner, by first reducing the image to a raster scan and then further analyzing and decoding the raster scanned image. The later step of analyzing and decoding the raster scanned image is typically accomplished by a host. In implementing the present invention, it is possible to use the cellular telephone connection 17 to transmit the raster scanned image. It is also possible to perform the step of analyzing and decoding the raster scanned image at the scanner 11 and transmit the decoded image over the cellular telephone connection 17.

It is possible to vary this operation according to the needs of a particular application. For example, it may be desired to first establish the connection in response to a manual request for establishment of connection. As indicated by the dotted line 91 in FIG. 2, it is also possible to activate a connection in response to a request for a scan. The scanner may be configured to await establishment of a connection prior to scanning.

Figure 3:
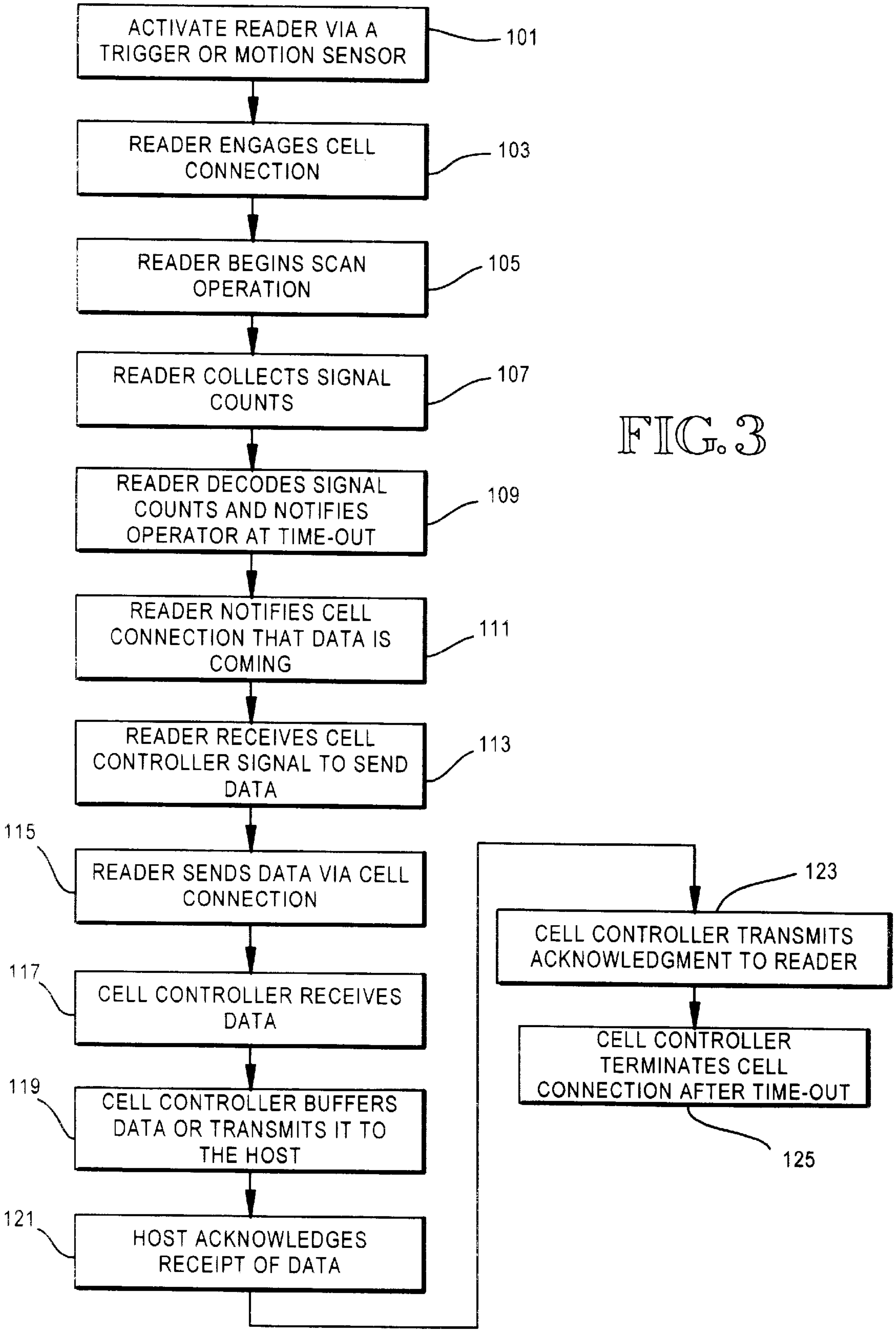
FIG. 3 is a flow diagram showing the operation of the inventive scanning system.

FIG. 3 shows the sequence of functions performed by the inventive scanner in one embodiment. The scanner 11 is first activated by a trigger or motion sensor, as indicated at block 101. This is followed by the scanner 11 engaging a call connection through the cellular module 39, as indicated at block 103. The scanner 11 then performs a scan operation, by beginning the scan, at block 105, collecting signal counts, at block 107, decoding the signal counts, at block 109, and notifying the operator at a timeout, at block 111.

The scanner 11 notifies the control module 35 that data is ready for transmission, at block 113, and the scanner 11 receives an acknowlegement, the scanner 11 supplies data to the control module 35, at block 115. The data is received by the control module 35, at block 117. The control module 35 then buffers and transmits the data to the host 23, at block 119. The host 23 acknowledges the receipt of data, at block 121, and the control module 35 provides a confirmation signal, at block 123. The control module 35 then terminates the cellular connection 17 after a timeout, at block 125.

There are, of course, a number of ways to implement this invention. For example, the use of transducers 45, 46 for voice communications is optional. It is also optional whether the cellular connections are initiated when the scanner is first activated, or only after data is scanned by the scanner 11. It is possible to provide various options for controlling the transmission of data, depending upon the circumstances of use of the scanner 11. For example, if the scanner 11 must engage a toll telephone connection in order to transmit the data, it may be desired to initiate the cellular connection manually, for example, after a number of scans have taken place. The scanner 11 can also be programmed to initiate the telephone connection 17 upon completion of a scan, and to close the connection upon complete transmission of the data.

The invention can be used for collecting other data besides scanned optical data. For example, the scanner 11 can be provided as a radio frequency identification (RFID) scanner or a magnetic strip scanner.

The cellular connection can be initiated by the host rather than the scanner. This implies that a scan can be effected in response to such a request by the host, and in the case of optical scanning, may require human intervention. In the case of RFID and other non-visual symbology media, host-initiated scanning may be more convenient because a scan can take place without aligning the scanner 11 and the scanned object.

While a camera-style scanner such as the Sabre 1551 Intermec scanner is depicted, it is also possible to use other types of optical scanning devices such as "pen" scanners and visual image scanners which transmit faster scans or the equivalent of a complete visual image for processing by the host 23. Accordingly, the invention should be read as limited only by the claims.

What is claimed is:

1. A device for scanning symbology and transmitting information contained therein to a remote host connected to a telephone system, said device comprising:

a) a housing having a handle portion configured to be gripped by an operator;

b) an optical scanner carried by said housing and capable of reading symbology when an operator gripping said handle portion moves said device into proximity of said symbology;

c) a cellular telephone module mounted in said housing and connectable to a cellular telephone network; and d) a modem mounted in said housing and interconnecting said scanner and said module to enable transmission of information contained in said symbology through said network;

e) a battery mounted in said housing to power said scanner, said module, and said modem; and f) a detection circuit for detecting an initial operation of the scanner to read symbology and obtain information contained in said symbology, and responding by opening a cellular connection to a pre-established telephone number.

2. The device of claim 1, comprising:

a controller within the housing and connected to the cellular telephone module and responding to the scanner to provide control signals to the cellular telephone module.

3. The device of claim 1, further comprising a voice transducer connected to the cellular telephone module.

4. The device of claim 1, in combination with a cellular telephone connection from the cellular telephone module to a host, whereby data from the scanner can be transmitted through the modem to the cellular telephone module and from the cellular telephone module to the host via the cellular telephone connection.

5. The device of claim 4, wherein the cellular telephone connection is maintained only long enough for the data to be transmitted to the host and for the host to acknowledge transmission.

6. The device of claim 5, wherein:

the optical scanner functioning to reduce scanned data to a bit stream and transmit the data in the bit stream to the modem so that the bit stream comprises decoded data from the symbology, thereby reducing a quantity of information to be transmitted through said cellular telephone network.

7. The device of claim 1, wherein the optical scanner functioning to reduce scanned data to a bit stream and transmit the data in the bit stream to the modem so that the bit stream comprises decoded data from the symbology, thereby reducing a quantity of information to be transmitted through said cellular telephone network.

8. The device of claim 1, comprising:

the optical scanner providing a signal corresponding to a scan of the symbology to the modem, the transmitted signal comprising undecoded data from the symbology.

9. The device of claim 1, wherein:

the optical scanner scans the symbology to generate an encodation of the symbology, and provides the encodation as a bit stream to the modem so that the transmission of information comprises transmission of undecoded data from the symbology.

10. Apparatus for scanning codes comprising:

a) a scanning device for detecting symbology;

b) a modem;

c) a cellular telephone module; and d) a controller connected to the cellular telephone module and causing the cellular telephone module to initiate a cellular telephone call to a pre-established telephone number in response to performance of a data retrieval operation, the data retrieval operation including positioning the scanning device into a position for obtaining a scan of data from the symbology, obtaining said scan and transmitting a signal corresponding to said scan to the modem.

11. The apparatus of claim 10, further comprising:

a cellular telephone connection from the cellular telephone module to a host;

wherein data from the scanning device can be transmitted through the modem to the cellular telephone module and through the cellular telephone connection from the cellular telephone module to the host.

12. The apparatus of claim 11, wherein the cellular telephone connection is maintained only long enough for the data to be transmitted to the host and for the host to acknowledge transmission.

13. Apparatus of claim 10, wherein the scanning device is a device for scanning bar codes.

14. Apparatus of claim 10, wherein the scanning device is a device for scanning transmission patterns from radio frequency identification (RFID) transponders.

15. Apparatus of claim 10, wherein the scanning device is a device for scanning data on a magnetic strip.

16. Method for reading and storing data comprising:

a) providing data in a format for scanning as a symbology image;

b) obtaining an optical scan of said data;

c) transmitting a signal corresponding to the optical scan to a modem;

d) establishing a cellular telephone connection, whereby a host is addressed and accessed through the cellular telephone connection; and e) transmitting the signal corresponding to the optical scan from the modem to the cellular telephone connection and thence to the host;

wherein establishing the cellular telephone connection includes opening the cellular telephone connection to a pre-established telephone number in response to an initial operation of a scanning device to obtain said scan and;

wherein the method further comprises detecting termination of use of the scanning device; and closing the cellular telephone connection upon detection of termination of use of the scanning device.

17. Method for reading and storing data comprising:

a) providing data in a format for scanning;

b) performing a data retrieval operation including positioning a scanner into a position for obtaining a scan of said data, obtaining said scan and transmitting a signal corresponding to the scan to a modem;

d) establishing a cellular telephone connection to a pre-established telephone number in automatic response to said data retrieval operation, whereby a host is addressed and accessed through the cellular telephone connection; and e) transmitting the signal corresponding to the scan from the modem to the cellular connection and thence to the host.

18. The method of claim 17, comprising:

providing a confirmation signal from the host to the modem through the cellular telephone connection to indicate that a successful scan of the data has taken place.

19. The method of claim 17, comprising:

a) providing the data in a format for scanning as a symbology image;

b) scanning the symbology image;

c) converting the symbology image to a bit stream corresponding to the symbology image; and d) providing the bit stream to the modem so that the bit stream comprises decoded data from the symbology image, thereby reducing a quantity of information to be transmitted over the cellular telephone connection to the host.

20. The method of claim 19, wherein the cellular telephone connection is maintained only long enough for said signal to be transmitted to the host and for the host to acknowledge transmission.

21. The method of claim 17, comprising:

a) detecting termination of use of the scanner; and b) closing the cellular telephone connection upon detection of termination of use of the scanner device.

22. The method as described in claim 17, comprising providing the data in a transmission pattern from a radio frequency identification (RFID) transponder, whereby said data retrieval operation obtains data from the RFID transponder and retransmits the data in a bit stream as the signal corresponding to the scan.

23. A device for scanning data and transmitting information contained therein to a remote host connected to a telephone system, said device comprising:

a) a housing having a handle portion configured to be gripped by an operator;

b) a scanner carried by said housing and capable of reading data in a transmission pattern from a radio frequency identification (RFID) transponder when an operator gripping said handle portion moves said device into proximity of said data;

c) a cellular telephone module mounted in said housing and connectable to a cellular telephone network;

d) a modem mounted in said housing and interconnecting said scanner and said module to enable transmission of said data through said network;

e) a battery mounted in said housing to power said scanner, said module, and said modem; and f) a detection circuit for detecting an initial operation of the scanner to read data in a transmission pattern from an RFID transponder, and responding by opening a cellular connection to a pre-established telephone number.

24. A device for scanning data and transmitting information contained therein to a remote host connected to a telephone system, said device comprising:

a) a housing having a handle portion configured to be gripped by an operator;

b) a scanner carried by said housing and capable of reading data on a magnetic strip when an operator gripping said handle portion moves said device into proximity of said data;

c) a cellular telephone module mounted in said housing and connectable to a cellular telephone network;

d) a modem mounted in said housing and interconnecting said scanner and said module to enable transmission of said data through said network;

e) a battery mounted in said housing to power said scanner, said module, and said modem; and a detection circuit for detecting an initial operation of the scanner to read data on a magnetic strip, and responding by opening a cellular connection to a pre-established telephone number.

25. Apparatus for scanning comprising:

a) a scanning device for reading data in a transmission pattern from an RFID transponder;

b) a modem;

c) a cellular telephone module; and d) a controller connected to the cellular telephone module and responding to a signal over a cellular telephone connection from a pre-established telephone number to initiate performance of a data retrieval operation, the data retrieval operation including activating the scanning device to read data in a transmission pattern from at least one RFID transponder and transmitting a signal corresponding to the data from said at least one RFID transponder to the modem and then to the pre-established telephone number.

* * * * *

UNITED STATES PATENT AND TRADEMARK OFFICE

CERTIFICATE OF CORRECTION

PATENT NO. : 6,212,401 B1
DATED : April 3, 2002
INVENTOR(S) : H. Sprauge Ackley

It is certified that error appears in the above-identified patent and that said Letters Patent is hereby corrected as shown below:

<u>Column 1,</u>
Line 32, "accurate" should be -- accurate. --.

<u>Column 2,</u>
Line 25, "optical" should be -- Optical --.

<u>Column 12,</u>
Line 1, insert -- f) -- at the beginning of the line.

Signed and Sealed this

Twenty-eighth Day of May, 2002

*Attest:*

JAMES E. ROGAN
*Director of the United States Patent and Trademark Office*

*Attesting Officer*